Figure 1:
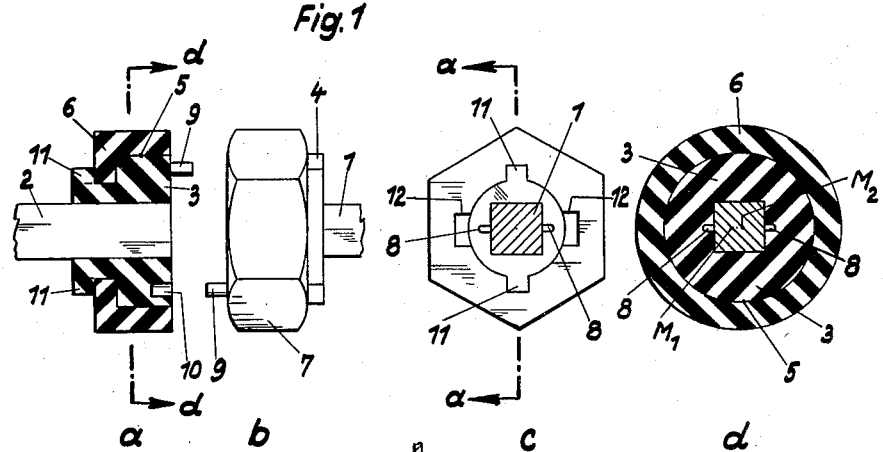

Dec. 29, 1959  H. L. NAIMER ET AL  2,919,151
SHAFT COUPLING AND LOCATING MEMBER
Filed March 24, 1958

INVENTORS:
HUBERT NAIMER
FRANZ BAUER
BY
Karl F. Ross
AGENT

United States Patent Office 2,919,151
Patented Dec. 29, 1959

2,919,151
SHAFT COUPLING AND LOCATING MEMBER

Hubert L. Naimer and Franz Bauer, Vienna, Austria; said Franz Bauer assignor to Hubert L. Naimer Application March 24, 1958, Serial No. 723,335

Claims priority, application Austria April 4, 1957

3 Claims. (Cl. 287—130)

This invention relates to a locating or coupling member for shafts, particularly for cornered-section shafts, as is useful, e.g., in conjunction with electrical rotary switches. In the construction and use of electrical apparatus, particularly of electrical switches, it is frequently necessary to couple two axially aligned shafts, e.g., to extend the actuating shaft of a switch or to enable a control of two aligned switches by a common actuating handle or in order to provide so-called door couplings, as are used when the rotary handle of an electrical switch is provided on a hinged door whereas the switch to be coupled thereto is affixed to a frame or rack provided behind this door; in this case it is difficult to construct the coupling in such a manner that the two coupling components interengage satisfactorily when the door is closed.

Where it is desired to couple two coaxially arranged shaft ends the simplest coupling used in this case consists of a coupling sleeve, which connects the two shaft ends and is clamped thereon by screws. These couplings, however, are objectionable inasmuch as in spite of their apparent simplicity their protection against undesired loosening requires complicated measures and they do not readily enable a cooperation between the shaft ends to be coupled and a coupling on a large surface, as is often desired for a perfect, chatterfree torque transmission.

Moreover, it is often desired to prevent a cornered-section shaft by a locating member from axial movements relative to a stationary stop. Whereas this problem could be solved by a simple collar having a set screw which acts radially on the shaft this solution often fails to provide adequate safety against an undesired loosening of this screw.

The present invention provides a locating or coupling member for shafts, particularly suitable for use with cornered-section shafts, which distinguishes by several advantages from the prior art: It ensures with simple means a gripping of the shaft end on all sides; it even in its simplest embodiment precludes reliably an undesired loosening without requiring additional safety means; it can be provided as an electrical insulator without any additional expenditure; and it can be mounted and removed in a much simpler manner. The present locating or coupling member employs a deformable, preferably insulating and elastic intermediate member which embraces the shaft and is characterized in that the intermediate member has an outside surface the cross-section of which, taken at right angles to its axis, has a non-circular form, preferably a centered oval form, and that a rotary member is provided, which embraces the intermediate member and has an inside boundary which is also non-circular or eccentric with respect to the outside surface of the intermediate member, which rotary member is rotatable relative to the intermediate member to urge the intermediate member against the shaft while reducing the internal width of the intermediate member. As a rule, this idea is realized so as to render the rotary member self-locking with respect to the intermediate member in the end position of the rotary member relative to the intermediate member so that a spontaneous opening of the locating or coupling member is prevented without additional safety means.

Since a very slight deviation from the circular form is sufficient such a coupling will provide a very snug engagement, particularly if the intermediate member consists of a moderately elastically deformable material, and the danger of a spontaneous loosening will be eliminated even in the case of chatter.

On principle, the locating or coupling member according to the invention is of a detachable type. Detachable shaft couplings in which elastic members are provided between the two shaft portions to be coupled usually require special safety means to prevent a separation of the coupling components in the axial direction. Such safety means are not necessary according to the invention because the intermediate member is firmly clamped on the shaft or the two shaft ends in such a manner as to preclude a spontaneous loosening.

Figure 2:
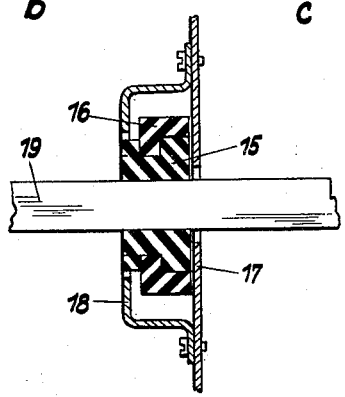
Figure 3:
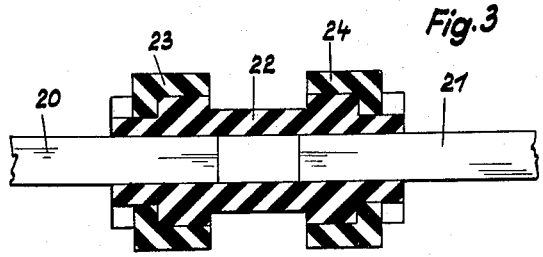

The accompanying diagrammatic drawings illustrate three possible applications of the component according to the invention, which is shown in Figs. 1a—d as a handle retaining device, a so-called door coupling, in Fig. 2 as a collar and in Fig. 3 as an actual shaft coupling. Figs. 1a and 1d comprise sectional views taken on lines a—a in Fig. 1c and d—d in Fig. 1a, respectively. Figs. 2 and 3 are axial sectional views. The problem underlying the illustrated embodiments is to couple a cornered-section shaft to a second cornered-section shaft and to locate the shaft with a collar. It will become obvious, however, that this problem can also be solved with round shafts.

In Figs. 1a–1d, 1 is the end of a cornered-section shaft, e.g., of a switch shaft, and 2 is the shaft which carries the rotary handle. The switch itself is insignificant in the present case and is not shown. Each of the shafts 1, 2 carries an intermediate member 3 or 4, the central opening of which enables the intermediate member to be easily slidably fitted on the shaft ends 1, 2. The outside surface 5 of each intermediate member forms a cylinder having a base which consists of two semicircles having the centres M1 and M2, Fig. 1d, and straight or slightly curved connecting lines; it is also possible to select a contour having the form of an ellipse or even of a circle which is eccentric with respect to the axis of the shaft 1, 2. The intermediate members 3, 4 fit with a slight clearance into a recess of the associated rotary member 6, 7. These recesses are suitably exactly in conformity with the outside periphery of the intermediate member. If the rotary members 6, 7 are rotated relative to the shaft ends 1, 2, the intermediate members 3, 4 will suffer a deformation, which causes each intermediate member to be forced tightly against the part 1 or 2 provided that the intermediate member is sufficiently deformable. To promote this deformation the intermediate members 3, 4 have cuts 8, one of which could extend to the periphery of the intermediate member. Each intermediate member could be constructed of several parts but this does not afford a substantial advantage and has the disadvantage of requiring several parts.

The rotary members 6, 7 have suitably a hexagonal outside profile corresponding to a standard size so that they can be rotated with usual wrenches. The intermediate members 3, 4 have interfitting coupling extensions 9 and recesses 10, respectively, so that the shaft ends 1, 2 will be coupled when the two coupling halves a, b are axially approached.

In the illustrated embodiment the rotary members 6, 7 have substantially the external form of a cap nut but contrary thereto do not carry a screw thread. The intermediate members 3, 4 have projections 11 and the end faces of the rotary members have recesses 12, through which the projections 11 can extend. Thus, the parts 3, 6 and 4, 7 can be interfitted and can be located in the relative position shown in the drawing by rotating them relative to each other.

The intermediate members 3, 4 are suitably made of a moderately deformable plastic of sufficient strength, e.g., of a polyamide or superpolyamide, relatively hard rubber or the like. This enables without difficulty the provision of a coupling which is self-locking in tightened condition; moreover, the coupling can easily be constructed to have electrical insulating properties in this case. The cuts 8 impart such a degree of yieldability to the intermediate members that an absolutely chatter-proof connection is obtained even without additional locking means, although such locking means may be provided in a simple manner, e.g., in the form of a radially extending safety pin (not shown), when desired in special cases.

In the embodiment shown in Fig. 2 the intermediate member 15, which is similar to the ones described hereinbefore but free of coupling extensions, forms together with the rotary member 16 a collar assembly, which will axially apply itself against a plate 17 or a cap 18 connected thereto when it is attempted to displace the continuous shaft 19 in one or the other axial direction. The construction and function of parts 15, 16 correspond to the description given in connection with Fig. 1.

Fig. 3 shows a coupling according to the invention formed as a double coupling, for connecting the two shaft ends 20, 21. Two intermediate members are combined to form a joint coupling member 22. The coupling is engaged by rotating the rotary members 23, 24 by means of appropriate wrenches to some extent relative to the part 22. The nature of the intermediate members and rotary members corresponds to the foregoing description.

For the construction of the component according to the invention as a coupling it is essential to transmit the torque only by the intermediate members whereas the rotary members should not be subjected to torsional stress because such a torque could cause a rotation of the rotary member relative to the intermediate member; in couplings for round shaft ends this would eliminate the ability to transmit torque.

The component according to the invention permits of numerous forms of construction. On principle, it is essential that an intermediate member which embraces the shaft, whereas it need not necessarily directly coact therewith, is deformed so as to clamp the shaft by the rotation of a rotary member which has a non-circular or eccentric inside surface, at least part of which deforms at least a part of the intermediate member so as to apply it tightly against the shaft. The rotation of the non-circular part has an effect which is similar to the insertion of a wedge between the intermediate and rotary members. For practical reasons, however, it is suitable to provide the non-circular shape as a centered oval or generally as a centered symmetrical shape to maintain the centering of the several elements even after the deforming movement has been performed.

We claim:

1. A coupling assembly comprising a pair of coaxially aligned shafts of polygonal cross-section, a pair of annular intermediate members of deformable material provided with polygonal bores mating with and slidingly receiving said shafts, respectively, a pair of annular outer members respectively embracing said intermediate members, each of said intermediate members having an outer surface of curved and non-circular cross-section, each of said outer members having an inner surface complementary to the outer surface of the corresponding intermediate member, and coupling means interconnecting said intermediate members for simultaneous rotation.

2. A coupling assembly according to claim 1 wherein said coupling means comprises an axial projection on one of said intermediate members, the other of said intermediate members being provided with an axial recess retractably receiving said projection.

3. A coupling assembly according to claim 1 wherein each of said outer members has a polygonal outer surface engageable by a wrench.

References Cited in the file of this patent

UNITED STATES PATENTS

| 506,039 | Freeman | Oct. 3, 1893 |
| 1,246,333 | Sclater | Nov. 13, 1917 |
| 2,578,809 | Ketchum | Dec. 18, 1951 |
| 2,818,280 | Budnik | Dec. 31, 1957 |

FOREIGN PATENTS

| 120,032 | Australia | June 4, 1945 |
| 428,419 | Italy | Dec. 16, 1947 |